July 23, 1968 M. FISCHMAN 3,394,272

PULSE GENERATOR

Filed Dec. 23, 1965

INVENTOR.
MARTIN FISCHMAN

BY R. J. Frank
ATTORNEY.

United States Patent Office 3,394,272

Patented July 23, 1968

3,394,272

PULSE GENERATOR

Martin Fischman, Wantagh, N.Y., assignor to General Telephone and Electronics Laboratories, Inc., a corporation of Delaware Filed Dec. 23, 1965, Ser. No. 515,904

5 Claims. (Cl. 307—275)

ABSTRACT OF THE DISCLOSURE

A pulse generator of the blocking oscillator type in which a series resonant circuit comprising an inductor and a capacitor precisely controls the duration of the output voltage pulses. A resistor is employed which provides a path for the capacitor discharge current, dissipates the energy stored in the magnetizing inductance of the transformer and prevents oscillatory voltage overswings. Good circuit performance is obtained with a relatively small number of components.

Figure 1:
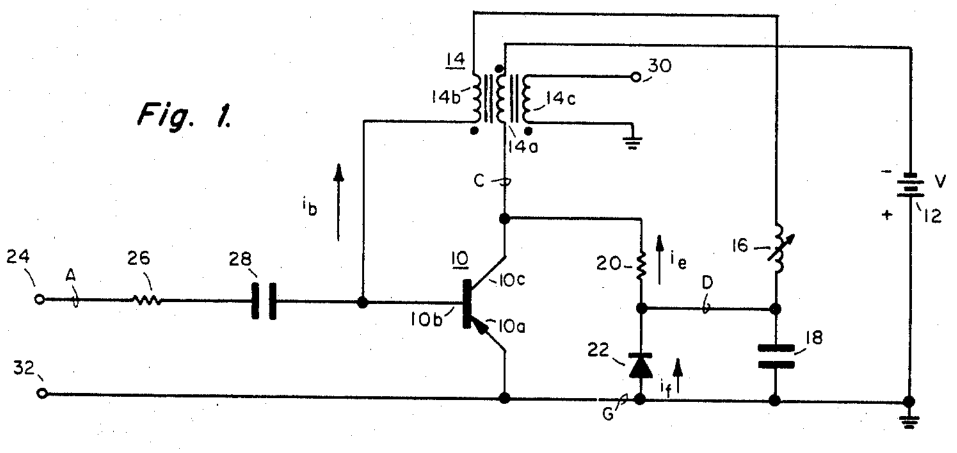

This invention relates to pulse generators and in particular to pulse generators of the blocking oscillator type which produce an output pulse in response to an input signal.

In U.S. Patent 3,200,261 granted Aug. 10, 1965 to William Geller and the present inventor, there is disclosed a triggered blocking oscillator or pulse generator wherein the pulse width or "on" time of the output voltage is precisely controlled and stabilized by a resonant circuit and in which the recovery or "off" time may be less than a pulse width. The patented generator has been found very useful for the regeneration of disorted pulses in pulse code modulation systems.

In the oscillator of the aforementioned patent, a series resonant circuit determines the width and stability of the output pulse. The recovery time is controlled by a transistor having its emitter and collector electrodes coupled across the capacitive element of the resonant circuit. During the interval that the output pulse is generated, the transistor is non-conducting presenting an essentially open circuit to the capacitor. At the termination of the output pulse, the transistor is driven into conduction becoming essentially a short circuit across the capacitor. Since the capacitor discharges rapidly through the transistor, the recovery time of the oscillator is short provided the energy stored in the magnetizing inductance of the blocking oscillator transformer can be dissipated quickly. Rapid dissipation of the energy in the transformer is obtained in the patented circuit by allowing the demagnetizing current to flow through a resistor coupled directly across a winding of the transformer.

While the circuit described in the patent operates in a very satisfactory manner, it also requires a relatively large number of components together with their associated wiring. Due to the increasing complexity of communication equipment, it is essential that the number of components be reduced as much as possible so the equipment will require a minimum amount of space, have maximum reliability and be as inexpensive as is consistent with good performance. Accordingly, it is an object of my invention to provide an improved pulse generator of the blocking oscillator type which more closely meets these requirements. More specifically, my circuit requires the addition to the basic blocking oscillator circuit of only a single resistor and an inexpensive rectifier whereas the oscillator of Patent 3,200,261 requires an additional transistor, two resistors, a capacitor and an additional transformer winding. Further, the reduction in parts in the present invention is obtained with essentially no degradation in circuit performance.

In the present invention, a pulse generator is provided in which a first winding of a transformer having at least two windings is coupled in series with a supply voltage across the first and third electrodes of a transistor. The second winding of the transformer is connected in series with an inductor. The series-connected second transformer winding and the inductor are connected between the second electrode of the transistor and a first end of a capacitor, the second end of the capacitor, being connected to the first electrode of the transistor. The inductor and capacitor have values such that they are resonant at a frequency determined by the desired duration of the output voltage pulse. A resistor is connected between the third electrode of the transistor and the first end of the capacitor. A diode is connected in parallel with the capacitor, the diode being poled to conduct current from the first electrode of the transistor toward the resistor. Means are provided for coupling an input trigger pulse between the first and second electrodes of the transistor. In addition, an output winding may be added to the transformer to provide D.C. isolation of the load from the pulse generator circuit.

As mentioned, the inductor and capacitor form a circuit having a resonant frequency which precisely determines the duration, or width, of the output pulses. The current through the inductor is sinusoidal and conducts for one-half of each cycle, each output pulse being initiated at the start of the current flow and cut off abruptly when the current falls to zero. Thus, the width of the output pulse is equal to one-half the resonant period of the inductor and capacitor.

In order to obtain a sinusoidal current and the resulting precise width control, the resistance across the capacitor must be high. However, if the resistance in shunt with the capacitor is high, the time required for the charge to leak off the capacitor will be long compared to the pulse width. Further, during the pulse period, magnetizing current flows in the transformer winding and this current must be reduced to zero during the interpulse period if full transformer recovery is to be effected. In the present invention, the resistor connected between the capacitor and the third electrode of the transistor combines three functions: it provides a path for the capacitor discharge current, it dissipates the energy stored in the magnetizing inductance of the transformer, and prevents oscillatory overswings which can cause undesired retriggering of the generator.

In one embodiment of the invention, the transistor is a type PNP and the first, second and third electrodes correspond to the emitter, base and collector electrodes respectively. When the circuit is in its quiescent state, the voltage across the capacitor is zero and the voltage between the collector and emitter electrodes of the transistor is equal to the supply voltage. An output pulse is produced by applying a short duration negative trigger pulse between the base and emitter electrodes of the transistor thereby driving the base electrode negative with respect to the emitter. The trigger pulse drives the transistor into conduction causing a sinusoidal current to flow into the base of the transistor and also causing current to flow out of the collector electrode into the transformer producing an output voltage pulse. The flow of base current charges the capacitor in a direction such that the junction of the capacitor and resistor becomes positive with respect to the emitter when the pulse is terminated. When the sinusoidal base current falls to zero, the transistor ceases conduction and the output pulse changes abruptly to a large negative value. This causes the positively charged capacitor to discharge rapidly through the resistor, this same discharge current flowing through the transformer to dissipate the energy stored in the magnetizing inductance. The recovery rate of the oscillator may be less than the pulse width, or about 0.15 microsecond, permitting trigger pulses to be applied at rates within the limits required by the regenerative repeaters used in pulse code modulation systems.

Figure 2:
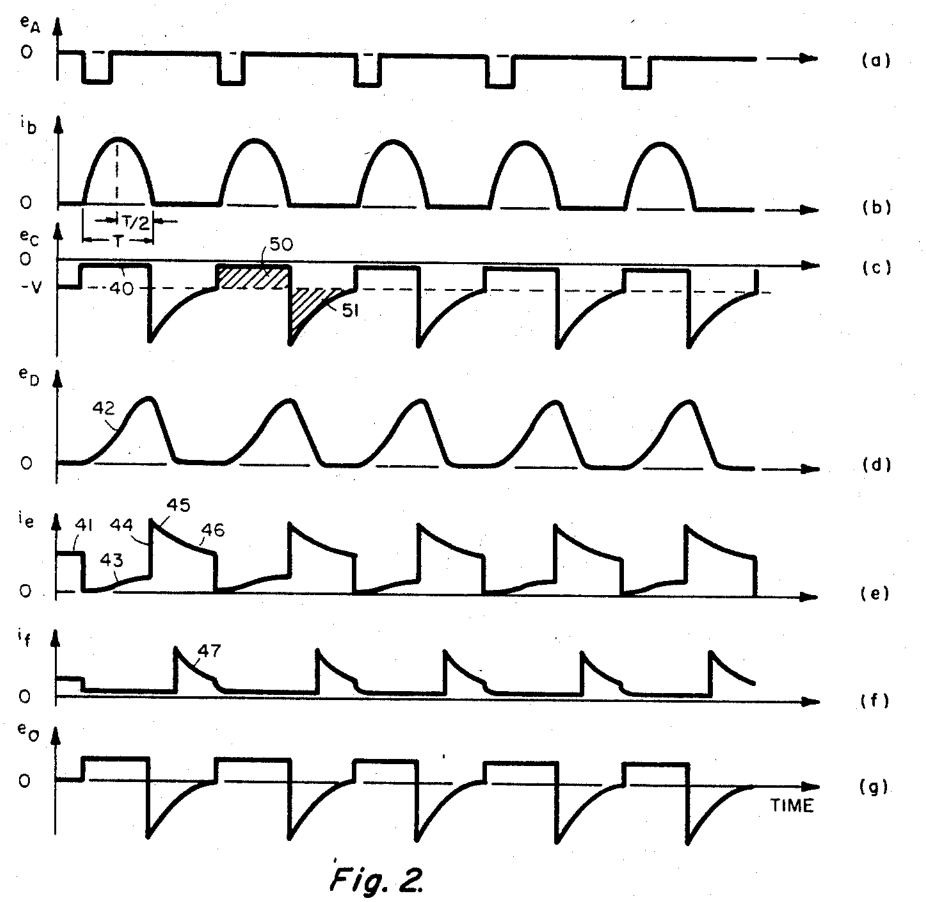

The above objects of and the brief introduction to the present invention will be more fully understood and further objects and advantages will become apparent from a study of the following description in connection with the drawings, wherein FIG. 1 is a schematic diagram of the invention and FIG. 2 shows current and voltage waveforms occurring in the circuit of FIG. 1.

Referring to FIG. 1, there is shown a type PNP transistor 10 having its emitter electrode 10*a* grounded and its collector electrode 10*c* connected to the negative terminal of a battery 12 through the first winding 14*a* of a transformer 14. A second winding 14*b* of the transformer is connected in series with a variable inductor 16, the other end of winding 14*b* being connected to the base 10*b* of transistor 10. A capacitor 18 is connected between the other end of inductor 16 and the emitter 10*a* of transistor 10. Inductor 16 is adjusted so that it is series resonant with capacitor 18 at a frequency having a half-period equal to the desired width, or duration of the output pulse. A resistor 20 is connected between the collector electrode 10*c* of transistor 10 and the junction of inductor 16 and capacitor 18. A diode 22 is connected in parallel with capacitor 18, the diode being poled to conduct current from emitter electrode 10*a* to the junction of inductor 16 and capacitor 18. An input terminal 24 is coupled to the base of transistor 10 through a series-connected resistor 26 and capacitor 28. An output terminal 30 is connected to one end of transformer output winding 14*c*.

When there is no signal applied between input terminal 24 and grounded input terminal 32, the base drive to transistor 10 is zero and the transistor is non-conducting. The voltage at point D across capacitor 18 is zero and the voltage at point C on the collector 10*c* of transistor 10 is equal to —V, the voltage output of supply 12. (In the following description all voltages are understood to be measured between the circuit point designated and ground.) Application of an input trigger pulse $e_A$ (FIG. 2*a*) to terminal 24 drives the base of transistor 10 negative with respect to its emitter and the transistor begins conduction. A sinusoidal current $i_b$ (FIG. 2*b*) begins to flow through the forward biased emitter-base junction of transistor 10, transformer winding 14*b*, inductor 16 and capacitor 18. This current increases from zero, goes through a maximum and then diminishes to zero. When the base drive becomes zero, transistor 10 is abruptly changed from its conducting to its non-conducting state.

The application of the input trigger $e_A$ to the base of transistor 10 also produces current flow from the emitter to the collector of transistor 10 through winding 14*a*. The changing current through winding 14*a* induces a voltage across winding 14*b* which is fed back to the base of transistor 10 with the proper magnitude and polarity to drive transistor 10 into saturation. When saturation is reached the transistor voltage remains substantially constant until the base current falls to a low value moving the transistor operating point out of the saturation region into a region of high dynamic gain. The oscillator then reverts to the non-conducting state. The collector voltage $e_C$ of transistor 10 during the "on" period is shown at 40 in FIG. 2*c*.

Maximum energy is stored in inductor 16 at time T/2 (FIG. 2*b*). As is evident from the voltage $e_D$ (FIG. 2*d*) across capacitor 18, all of the energy has been transferred to capacitor 18 at time T, the charge in capacitor 18 holding transistor 10 cut off. Thus, the recovery time of the oscillator, i.e. the time between peaks, is not limited by the time required to discharge capacitor 20. The duration of the "on" period T equals $\pi\sqrt{LC}$ where T is the width of the pulse in sections, L is the inductance of inductor 16 in henries, and C is the capacitance of capacitor 18 in farads.

The current $i_e$ flowing through resistor 20 into the collector electrode of transistor 10 is shown in FIG. 2*e*. During the interval 41 before the input pulse $e_A$ is applied, the collector voltage $e_C$ is at —V and a constant current flows from ground through diode 22, resistor 20, transformer winding 14*a* and power supply 12. When the input pulse is applied, transistor 10 becomes conductive and the collector voltage $e_C$ rises abruptly to a value close to zero as the collector to emitter resistance of the transistor is suddenly decreased. The change in collector voltage causes the current $i_e$ through resistor 20 to drop to almost zero and then begin to increase as the voltage $e_D$ across capacitor 18 increases as shown at 42 and 43 in FIGS. 2*d* and 2*e* respectively. When the sinusoidal current pulse $i_b$ becomes zero at the end of the period T, the transistor is cut off and the collector voltage $e_C$ is driven sharply negative as current continues to flow through winding 14*a* due to the energy stored in the magnetizing inductance of the transformer. This current is supplied through resistor 20 as shown at 44 and substantially independent of the ohmic value of resistor 20 although the voltage across the transformer windings is proportional to the resistor value. During the initial part 45 of the interpulse period the demagnetizing current is equal to the capacitor discharge current. After capacitor 18 has discharged and the voltage at point D has dropped to zero the demagnetizing current is supplied through diode 22. This is shown at 46 in FIG. 2*e* and 47 in FIG. 2*f*.

Since the average value of the collector voltage $e_C$ must be equal to that of supply voltage 12 (the D.C. drop across the transformer windings being negligible), the areas 50 and 51 of FIG. 2*c* showing the voltage excursions below and above the supply voltage —V must be equal. In order to effect fast circuit recovery, the collector voltage swing after the input pulse must be appreciable so that a large overshoot will occur. However, the large change in collector voltage may cause an oscillatory condition to be set up in the pulse generator with subsequent undesired retriggering of the generator. It is one function of resistor 20 to provide the damping needed to prevent such retriggering.

As previously explained, resistor 20 also provides a path for reducing the transformer magnetizing current to zero and also for reducing the voltage across timing capacitor 18 to zero during the interpulse period. Due to the relatively high value of resistor 20 it has substantially no effect on the output pulse.

Transformer winding 14*c* provides D.C. isolation of the load from the pulse generator circuit. The voltage $e_O$ (FIG. 2*g*) between output terminal 30 and ground has the same waveform as the collector voltage $e_C$ shown in FIG. 2*c*. However, the average value of the output voltage $e_O$ is zero whereas the average value of the collector voltage $e_C$ is —V.

Typical values for the circuit elements used in the invention are as follows:

| | |
|---|---|
| Transistor **10** | Type 2N782 |
| Supply voltage **12** | volts 6 |
| Transformer **14** winding ratio **14***a*:**14***b*:**14***c* | 3:1:1 |
| Inductor **16** | microhenries 7 |
| Capacitor **18** | micromicrofarads 100 |
| Resistor **20** | ohms 10,000 |
| Diode **22** | Type 1N279 |
| Resistor **26** | ohms 1000 |
| Capacitor **28** | micromicrofarads 50 |

Although a type PNP transistor was used in the embodiment of the invention described above, type NPN transistors may also be used.

As many changes could be made in the above construction and many different embodiments could be made without departing from the scope thereof, it is intended that all matter contained in the above description or shown in the accompanying drawings shall be interpreted as illustrative and not in a limiting sense.

What is claimed is:

1. A pulse generator for producing voltage pulses comprising (a) a transistor having first, second and third electrodes, (b) a transformer having at least first and second windings, the first winding of said transformer being coupled between the first and third electrodes of said transistor, (c) an inductor coupled in series with the second winding of said transformer, the resulting series circuit having first and second ends, (d) a capacitor having first and second ends, the first end of said capacitor being connected to the first end of said series circuit and the second end of said capacitor being connected to the first electrode of said transistor, the second end of said series circuit being connected to the second electrode of said transistor, (e) a resistor connected between the first end of said capacitor and the third electrode of said transistor, and (f) a rectifying element connected in parallel with said capacitor.

2. A pulse generator as defined by claim 1 wherein the first, second and third electrodes of said transistor are the emitter, base and collector electrodes respectively.

3. A pulse generator as defined by claim 1 wherein said inductor and capacitor are series resonant at a frequency determined by the desired duration of said voltage pulses.

4. A pulse generator as defined by claim 1 wherein said rectifying element is a diode poled to conduct current from the first electrode of said transistor to said resistor.

5. A pulse generator as defined by claim 1 wherein means are provided for coupling input trigger pulses between the first and second electrodes of said transistor.

No references cited.

ARTHUR GAUSS, *Primary Examiner.*

J. ZAZWORSKY, *Assistant Examiner.*